United States Patent
Tsai

(10) Patent No.: US 10,998,839 B2
(45) Date of Patent: May 4, 2021

(54) SYSTEM AND METHOD FOR DRIVING A MOTOR TO ROTATE AT A HIGH SPEED

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/662,242

(22) Filed: Oct. 24, 2019

(65) Prior Publication Data

US 2021/0013819 A1    Jan. 14, 2021

(30) Foreign Application Priority Data

Jul. 10, 2019   (TW) .................................. 108124215

(51) Int. Cl.
 *H02P 7/29* (2016.01)
 *H02P 23/04* (2006.01)
(52) U.S. Cl.
 CPC .................................. *H02P 23/04* (2013.01)
(58) Field of Classification Search
 CPC ....................................................... H02P 23/04
 See application file for complete search history.

(56) References Cited

U.S. PATENT DOCUMENTS

| 7,940,107 B2* | 5/2011 | Chen ...................... H02H 9/004 327/312 |
| 2010/0054964 A1* | 3/2010 | Teng ..................... F04D 27/004 417/326 |
| 2018/0234036 A1* | 8/2018 | Pallones ................... H02P 6/28 |

FOREIGN PATENT DOCUMENTS

WO    WO 2018016070 A1    1/2018

* cited by examiner

*Primary Examiner* — Muhammad S Islam
(74) *Attorney, Agent, or Firm* — Li & Cai Intellectual Property (USA) Office

(57) ABSTRACT

A system and a method for driving a motor to rotate at a high speed are provided. The system includes a lookup table, a command detector, a pattern selector and a motor driver. The lookup table module is configured to store a reference waveform pattern and a modulated waveform pattern. An amplitude of the modulated waveform pattern is larger than an amplitude of the reference waveform pattern. The command detector is configured to receive a rotating speed command. The pattern selector is configured to receive the reference waveform pattern and the modulated waveform pattern, and select the reference waveform pattern or the modulated waveform pattern according to the rotating speed command. The motor driver is configured to output a driving signal to drive the motor according to the selected reference waveform pattern or modulated waveform pattern.

6 Claims, 5 Drawing Sheets

SYSTEM AND METHOD FOR DRIVING A MOTOR TO ROTATE AT A HIGH SPEED

CROSS-REFERENCE TO RELATED PATENT APPLICATION

This application claims the benefit of priority to Taiwan Patent Application No. 108124215, filed on Jul. 10, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system for driving a motor, and more particularly to a system and a method for driving a motor to rotate at a high speed.

BACKGROUND OF THE DISCLOSURE

In recent years, with the rapid development of personal computers (PC), portable computers such as notebooks (NB) or work stations, operational chips such as central processor units (CPU) and digital signal processors (DSP) are capable of operating more quickly. A frequency of the chip increases with an increase of an operational speed of the chip such that the chip generates large amounts of heat. As a result, the chip can operate abnormally at high temperatures, thereby affecting surrounding circuits thereof. Therefore, it is important that the chip has better heat dissipation efficiency.

Generally, the motor obtains supplied power and is driven to rotate based on a driving waveform pattern (which is called a reference waveform pattern as used herein) during a duty cycle of a pulse width modulation (PWM) signal. A rotating speed of the motor changes linearly with an amplitude of the driving waveform pattern. For example, when the duty cycle of the PWN signal is 50%, the amplitude of the driving waveform pattern is reduced by half and thus an output power of the motor is reduced by half. However, low and high rotating speed requirements cannot be realized by using common driving waveform patterns. Under the same load of the motor, when the duty cycle of the PWM signal of the motor is lower than a ratio such as 20%, the motor is intended to be driven to rotate at a low speed based on the driving waveform pattern to meet minimum heat dissipation and low noise requirements. For example, when the motor is driven based on third-order harmonic waveforms or sinusoidal waveforms, only low noise is generated. Conversely, when the motor of a fan is driven to rotate at a high speed to meet a maximum heat dissipation requirement, high noise is generated by a blade cutting into air. Therefore, when the duty cycle of the PWM signal of the motor is higher than a ratio such as 50%, the motor is driven to rotate at a high speed based on a driving waveform pattern (which is called a modulated waveform pattern as used herein) to meet high rotating speed requirements, instead of the low noise requirement. It is therefore apparent that a motor driver device must store different waveforms required for the motor operating at low and high rotating speeds.

SUMMARY OF THE DISCLOSURE

In response to the above-referenced technical inadequacies, the present disclosure provides a system for driving a motor to rotate at a high speed. The system includes a lookup table module, a command detector, a pattern selector and a motor driver. The lookup table module is configured to store a reference waveform pattern and a modulated waveform pattern. A waveform of the reference waveform pattern is different from a waveform of the modulated waveform pattern. An amplitude of the modulated waveform pattern is larger than an amplitude of the reference waveform pattern. The command detector is configured to receive a rotating speed command. The pattern selector is connected to the lookup table module and the command detector. The command detector is configured to receive the reference waveform pattern and the modulated waveform pattern, and select the reference waveform pattern or the modulated waveform pattern according to the rotating speed command. The motor driver is connected to the pattern selector, and configured to drive the motor to rotate according to the reference waveform pattern or the modulated waveform pattern that is selected by the pattern selector.

In certain embodiments, the reference waveform pattern includes a sinusoidal waveform pattern, a third harmonic waveform pattern, or combination thereof.

In certain embodiments, the modulated waveform pattern includes a trapezoidal waveform pattern, a square wave pattern, or combination thereof.

In certain embodiments, the command detector determines that the rotating speed command does not reach a threshold, the command detector selects the reference waveform pattern. When the command detector determines that the rotating speed command reaches the threshold, the command detector selects the modulated waveform pattern.

In addition, the present disclosure provides a method for driving a motor to rotate at a high speed. The method includes the following steps: providing a reference waveform pattern and a modulated waveform pattern by a lookup table module, wherein a waveform of the reference waveform pattern is different from a waveform of the modulated waveform pattern and an amplitude of the modulated waveform pattern is larger than an amplitude of the reference waveform pattern; receiving a rotating speed command by a command detector; selecting the reference waveform pattern or the modulated waveform pattern according to the rotating speed command by a pattern selector; and driving the motor to rotate, according to the reference waveform pattern or the modulated waveform pattern that is selected by the pattern selector, by a motor driver.

In certain embodiments, the reference waveform pattern includes a sinusoidal waveform pattern, a third harmonic waveform pattern, or combination thereof.

In certain embodiments, the modulated waveform pattern includes a trapezoidal waveform pattern, a square wave pattern, or combination thereof.

In certain embodiments, the step of selecting the reference waveform pattern or the modulated waveform pattern further includes: determining, by the command detector, whether or not the rotating speed command reaches a threshold, in response to determining that the rotating speed command does not reach a threshold, the command detector selects the reference waveform pattern, in response to determining that the rotating speed command reaches the threshold, the command detector selects the modulated waveform pattern.

As described above, the present disclosure provides the system and the method for driving the motor to rotate at the high speed, which drive the motor to rotate based on the reference waveform pattern such as the sinusoidal waveform or the third harmonic waveform such that the motor only generates low vibration noise to meet a client's requirement. The motor may be switched to be driven to rotate at the high speed based on the trapezoidal waveform or the square waveform such that the fan applying the motor has a better heat dissipation effect to effectively reduce the temperature of the integrated circuit, thereby preventing the integrated circuit from being damaged by a high temperature. Therefore, the system and the method for driving the motor to rotate at the high speed provided by the present disclosure have better applicability and utility.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
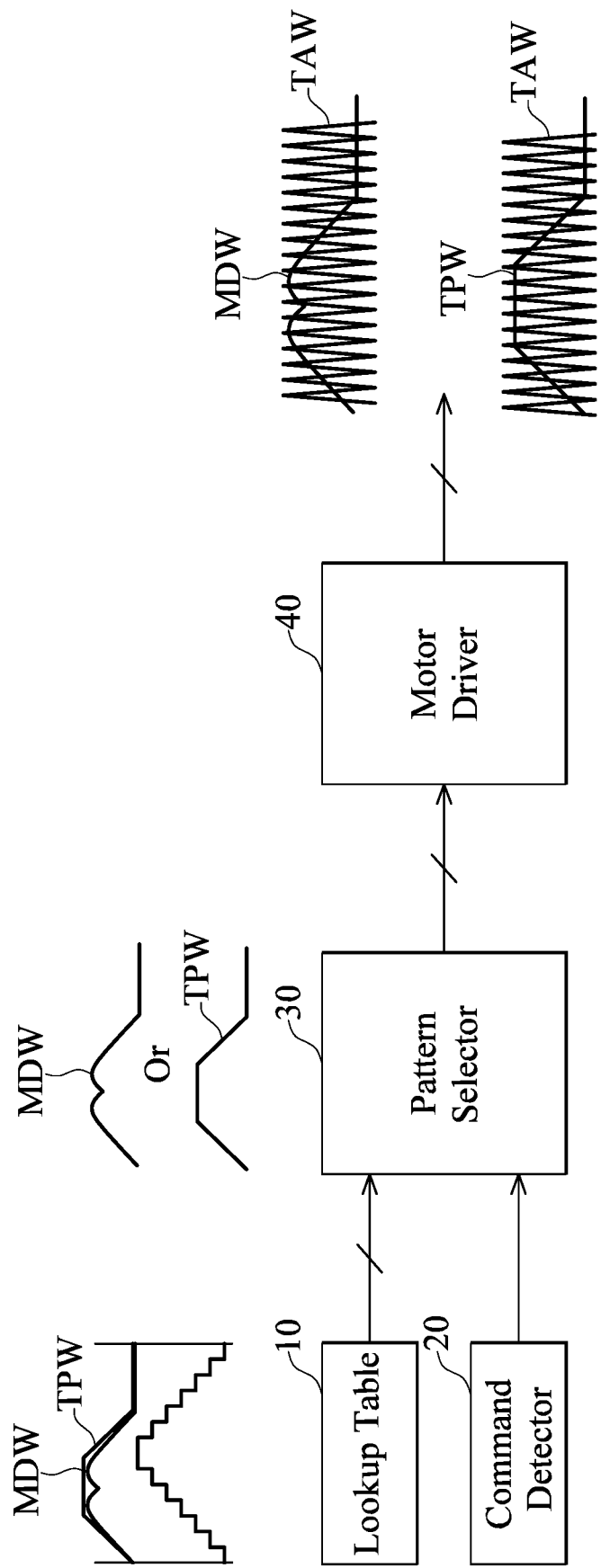
FIG. 1 is a block diagram of a system for driving a motor to rotate at a high speed according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

With reference is made to FIG. 1, which is a block diagram of a system for driving a motor to rotate at a high speed according to an embodiment of the present disclosure. As shown in FIG. 1, in the embodiment, the system for driving the motor to rotate at the high speed includes a lookup table module 10, a command detector 20, a pattern selector 30 and a motor driver 40. The pattern selector 30 is connected to the lookup table module 10 and the command detector 20. The motor driver 40 is connected to the pattern selector 30.

The lookup table module 10 may a lookup table, a database, a register, a memory, or other components having a function of storing data. The lookup table module 10 may be configured to store a reference waveform pattern MDW and a modulated waveform pattern TPW. A duty cycle of the modulated waveform pattern TPW may be equal to a duty cycle of the reference waveform pattern MDW, but the present disclosure is not limited thereto.

It is worth noting that a waveform of the reference waveform pattern MDW is different from a waveform of the modulated waveform pattern TPW and an amplitude of the modulated waveform pattern TPW is larger than an amplitude of the reference waveform pattern MDW. For example, the reference waveform pattern MDW includes a sinusoidal waveform pattern, a third harmonic waveform pattern, or combination thereof. The modulated waveform pattern TPW includes a trapezoidal waveform pattern, a square wave pattern, or a combination thereof.

The command detector 20 is configured to receive a rotating speed command from an external circuit such as an external integrated circuit or an external detector circuit for detecting parameters of an integrated circuit and then detect an instruction of the rotating speed command. The rotating speed command may include an instructed rotating speed of the motor, or other data related to the rotating speed such as an amplitude and a duty cycle of a waveform of a driving signal used to drive the motor.

The pattern selector 30 is configured to receive the reference waveform pattern MDW and the modulated waveform pattern TPW from the lookup table module 10. The pattern selector 30 selects the reference waveform pattern MDW or the modulated waveform pattern TPW to be transmitted to the motor driver 40 according to the detected instruction of the rotating speed command from the command detector 20. The motor driver 40 is configured to output a driving signal to drive the motor according to the reference waveform pattern MDW or the modulated waveform pattern TPW that is selected by the pattern selector 30.

In detail, when the rotating speed instructed by the rotating speed command is low, for example, lower than a rotating speed threshold, the pattern selector 30 selects the reference waveform pattern MDW, such as the sinusoidal waveform pattern or the third harmonic waveform pattern, which has a small amplitude. The motor driven based on the reference waveform pattern MDW generates only low noise. The motor driver 40 compares the selected reference waveform pattern MDW with a triangle wave signal TAW to output a driving signal to the motor to drive the motor to rotate at a low speed such as 2000 RPM that is instructed by the rotating speed command. For example, the driving signal has a pulse wave or a square wave.

It is worth noting that, when the rotating speed is larger than a rotating speed threshold, or a duty cycle reaches or is larger than a threshold TH, as instructed by the rotating speed command, the rotating speed of the motor cannot be increased by modulating a duty cycle of the reference waveform pattern MDW such as the sinusoidal waveform pattern or the third harmonic waveform pattern. Therefore, the pattern selector 30 selects the modulated waveform pattern TPW having a larger amplitude. The motor driver 40 compares the selected modulated waveform pattern TPW with the triangle wave signal TAW to output the driving signal having a larger amplitude to the motor to drive the motor to rotate at a higher speed such as 2200 RPM. Therefore, a fan using the motor can provide a better heat dissipation effect for an integrated circuit.

In order to quickly switch the rotating speed of the motor, the pattern selector 30 may synchronously receive the reference waveform pattern MDW and the modulated waveform pattern TPW that have different waveforms and amplitudes. When the command detector 20 determines that the received rotating speed command instructs a high rotating speed mode, the reference waveform pattern MDW is switched to the modulated waveform pattern TPW to instantly increase the rotating speed of the motor. Conversely, when the command detector 20 determines that the received rotating speed command instructs a low rotating speed mode, the modulated waveform pattern TPW is switched to the reference waveform pattern MDW to instantly reduce the rotating speed of the motor.

Figure 2:
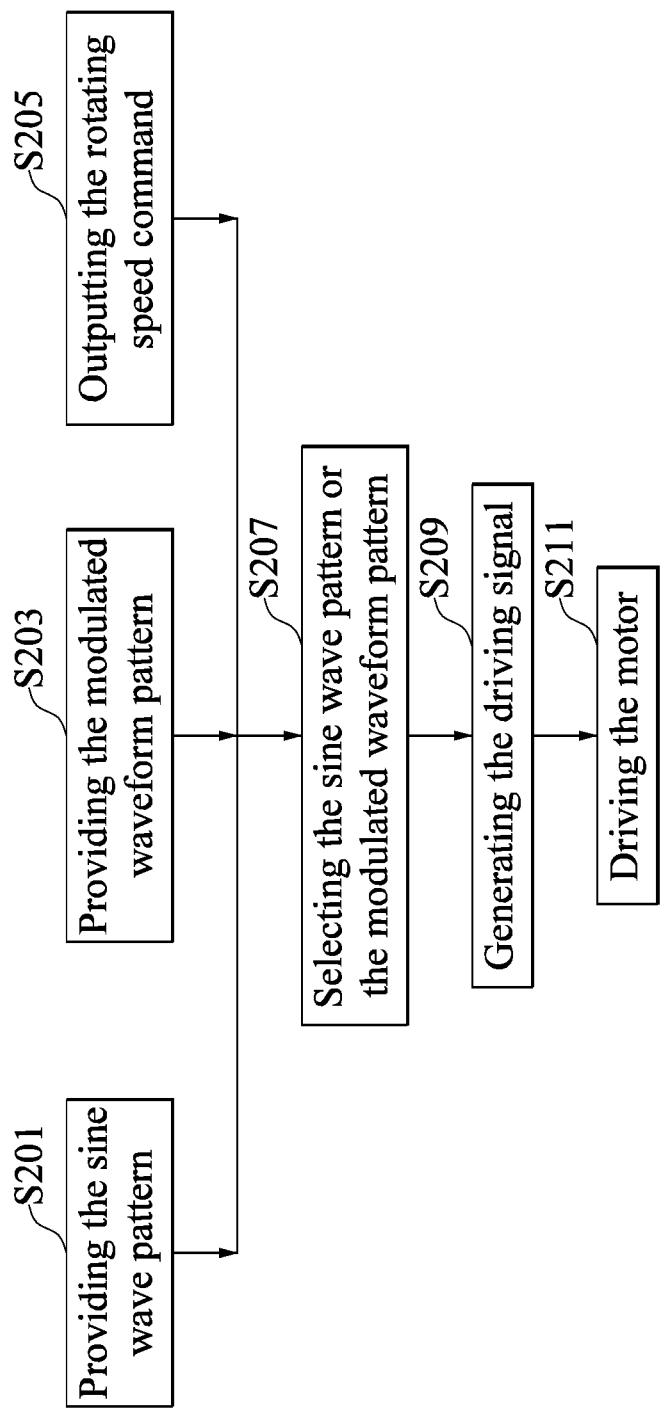
FIG. 2 is a flowchart diagram of a method for driving the motor to rotate at the high speed according to the embodiment of the present disclosure.

With reference is made to FIG. 2, which is a flowchart diagram of a method for driving the motor to rotate at the high speed according to the embodiment of the present disclosure. As shown in FIG. 2, in the embodiment, the method for driving the motor to rotate at the high speed includes steps S201 to S211 for the above-mentioned system.

In step S201, the lookup table module 10 provides the stored reference waveform pattern MDW such as the sinusoidal waveform pattern or the third harmonic waveform pattern.

In step S203, the lookup table module 10 provides the modulated waveform pattern TPW stored therein. The waveform of the modulated waveform pattern TPW such as the trapezoidal waveform or the square wave is different from the waveform of the reference waveform pattern MDW. The amplitude of the modulated waveform pattern TPW is larger than the amplitude of the reference waveform pattern MDW.

In step S205, an external circuit is configured to output a preset rotating speed command, a programmed rotating speed command, or a rotating speed command that is adjusted according to parameters of an integrated circuit to the command detector 20. For example, the external circuit is an external integrated circuit, or an external detector circuit for detecting an input voltage, an output voltage, an input current, an output current, a temperature or other parameters of the external integrated circuit. The command detector 20 may detect the rotating speed or other related data which is instructed by the rotating speed command.

In step S207, the pattern selector 30 selects the reference waveform pattern MDW or the modulated waveform pattern TPW according to the rotating speed command.

In step S209, the motor driver 40 compares the reference waveform pattern MDW with the triangle wave signal TAW to generate a driving signal having a pulse wave or a square wave.

In step S211, the motor driver 40 outputs the driving signal to the motor to drive the motor to rotate.

Figure 3:
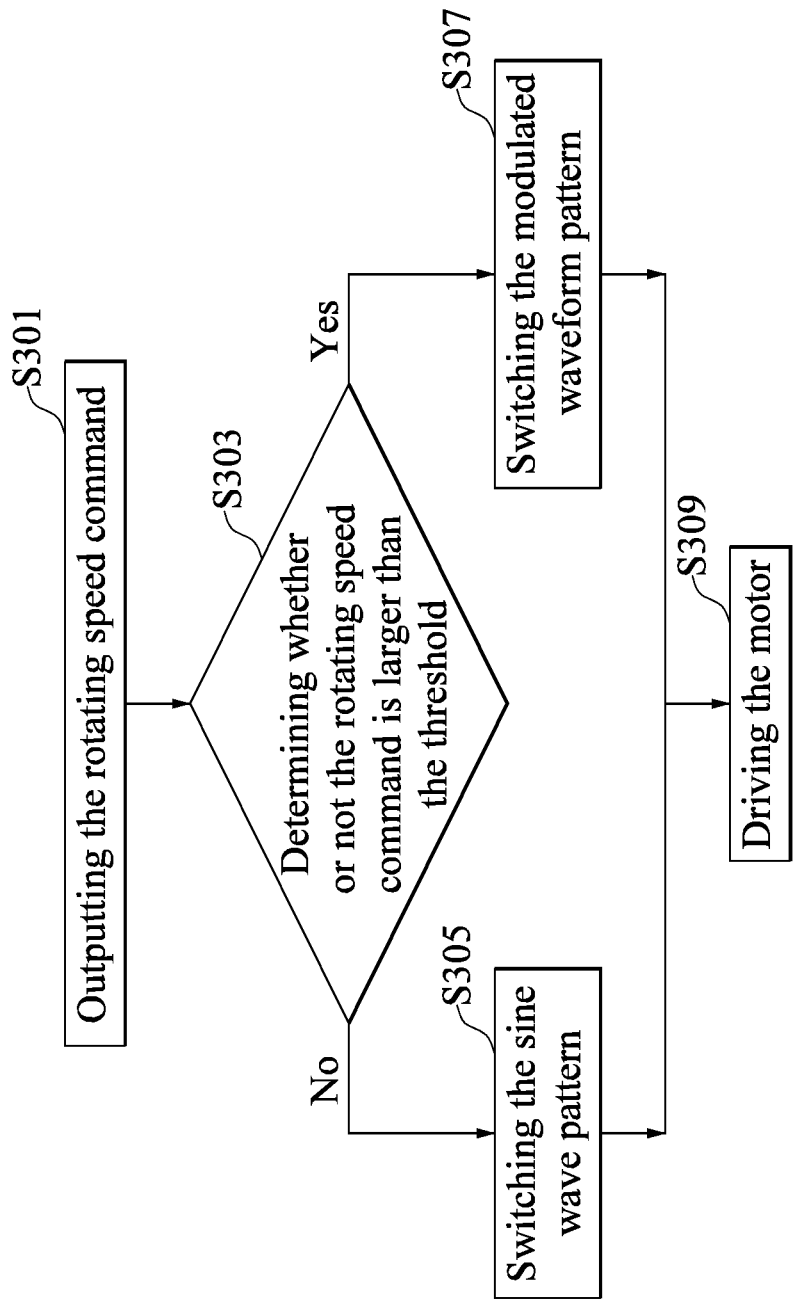
FIG. 3 is a flowchart diagram of the method for driving the motor to rotate at the high speed according to the embodiment of the present disclosure.

With reference is made to FIG. 3, which is a flowchart diagram of the method for driving the motor to rotate at the high speed according to the embodiment of the present disclosure. As shown in FIG. 3, in the embodiment, the method for driving the motor to rotate at the high speed includes steps S301 to S309 for the above-mentioned system.

In step S301, the external integrated circuit or other circuit outputs the rotating speed command.

In step S303, the command detector 20 receives the rotating speed command and determines whether or not the rotating speed, the duty cycle or the like which is instructed by the rotating speed command is larger than or reaches the threshold TH. If the command detector 20 determines that the rotating speed, the duty cycle or the like is not larger than or does not reach the threshold TH, step S305 is performed. If the command detector 20 determines that the rotating speed, the duty cycle or the like is larger or reaches the threshold TH, step S307 is performed.

In step S305, if the rotating speed, the duty cycle or the like as instructed by the rotating speed command is not larger or does not reach the threshold TH, the pattern selector 30 selects the reference waveform pattern MDW such as the sinusoidal waveform pattern or the third harmonic waveform pattern to be outputted to the motor driver 40.

In step S307, if the rotating speed, the duty cycle or the like as instructed by the rotating speed command is larger or reaches the threshold TH, the pattern selector 30 selects the modulated waveform pattern TPW such as the trapezoidal waveform pattern or the square waveform pattern to be outputted to the motor driver 40.

In step S309, when the motor driver 40 receives the reference waveform pattern MDW from the pattern selector 30, the motor driver 40 drives the motor to rotate at the low speed such that the motor generates only low noise based on the selected reference waveform pattern MDW. When the motor driver 40 receives the modulated waveform pattern TPW from the pattern selector 30, the motor driver 40 drives the motor to rotate at a high speed based on the selected modulated waveform pattern TPW.

Figure 4:
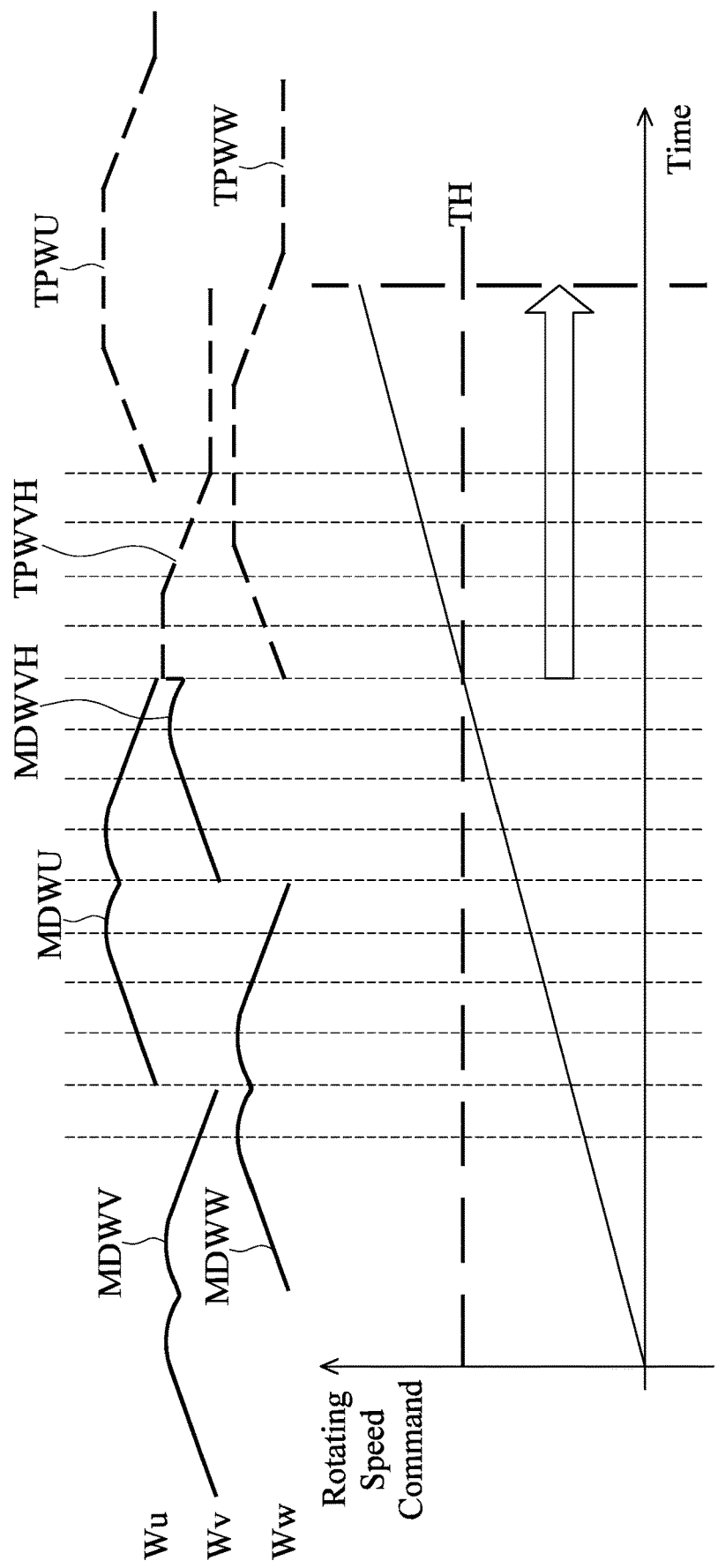
FIG. 4 is a waveform diagram of a driving signal of a motor that is switched to have a trapezoidal waveform from a sinusoidal waveform when a rotating speed command reaches a threshold, a back electromotive force signal and a zero-crossing signal according to the system and the method for driving the motor to rotate at the high speed of the embodiment of the present disclosure.

With reference is made to FIG. 4, which is a waveform diagram of a driving signal of a motor that is switched to have a trapezoidal waveform from a sinusoidal waveform when a rotating speed command reaches a threshold, a back electromotive force signal and a zero-crossing signal according to the system and the method for driving the motor to rotate at the high speed of the embodiment of the present disclosure.

For example, the motor is a three-phase motor, which has three phases that are a U phase, a V phase and a W phase.

As shown in FIG. 4, the command detector 20 receives the rotating speed command and then detects the rotating speed command Before the command detector 20 determines that a duty cycle or a rotating speed that is instructed by the rotating speed command reaches the threshold TH, the pattern selector 30 selects the reference waveform pattern such as a reference waveform pattern MDWU of the U phase, a reference waveform pattern MDWV of the V phase or a reference waveform pattern MDWW of the W phase. The reference waveform patterns MDWU, MDWV and MDWW are third harmonic waveform patterns or sinusoidal waveform patterns in practice.

The motor driver 40 outputs a driving signal respectively to the three phases of the motor to drive the motor based on the reference waveform pattern MDWU, MDWV and MDWW that is selected by the pattern selector 30 and the triangle wave signal TAW.

Conversely, when the command detector 20 determines that a duty cycle or a rotating speed which is instructed by the rotating speed command reaches the threshold TH, the pattern selector 30 selects the modulated waveform pattern to replace the reference waveform pattern.

As shown in FIG. 4, when the command detector 20 determines that the duty cycle or the rotating speed that is instructed by the rotating speed command reaches the threshold TH, the pattern selector 30 selects a modulated waveform pattern TPWU to replace the reference waveform pattern MDWU. For example, the modulated waveform pattern TPWU has trapezoidal waveforms, but the present disclosure is not limited thereto. In practice, the trapezoidal waveforms may be replaced with square waveforms. The motor driver 40 outputs the modulated waveform pattern TPWU to the U phase of the motor instead.

It is worth noting that, when the command detector 20 determines that the duty cycle or the rotating speed that is instructed by the rotating speed command reaches the threshold TH, a voltage of the reference waveform patterns MDWU of the U phase reduces to be a zero value. That is, one period of the reference waveform pattern MDWU such as the third harmonic waveform or the sinusoidal waveform pattern are outputted. The motor driver 40 generates the driving signal based on the modulated waveform pattern TPWU having a complete trapezoidal waveform and the triangle wave signal TAW. The motor driver 40 outputs the driving signal to the motor after waiting for a non-working period of the modulated waveform pattern TPWU.

However, when the command detector 20 determines that the duty cycle or the rotating speed that is instructed by the rotating speed command reaches the threshold TH, the motor driver 40 outputs the driving signal to the V phase of the motor, based on an incomplete such as one half period of reference waveform pattern MDWVH such as the third harmonic waveform. An incomplete modulated waveform pattern TPWVH, such as a half period thereof, is outputted successively after the reference waveform pattern MDWVH.

As described above, in the embodiment, when the rotating speed command reaches the threshold TH, the reference waveform pattern MDWV is switched to the modulated waveform pattern TPWVH without waiting for one period of the reference waveform pattern MDWV. Therefore, as shown in FIG. 4, the motor driver 40 generates a waveform which is composed of the incomplete reference waveform pattern MDWVH such as half of the third harmonic waveform and the incomplete modulated waveform pattern TPWVH such as half of the trapezoidal waveform.

When the command detector 20 determines that the duty cycle or the rotating speed as instructed by the rotating speed command reaches the threshold TH, a voltage of the reference waveform pattern MDWW of the W phase reduces to zero value. At this time, one period of the reference waveform pattern MDWW such as the third harmonic waveform or the sinusoidal waveform pattern has been outputted. The motor driver 40 generates a driving signal based on a modulated waveform pattern TPWW having a complete trapezoidal wave that is selected by the pattern selector 30 and the triangle wave signal TAW. The motor driver 40 outputs the driving signal to the motor after waiting for a non-working period of the reference waveform pattern MDWW.

As shown in FIG. 4, in the embodiment, the rotating speed instructed by the rotating speed command received by the command detector 20 linearly changes over time and the change occurs more and more quickly. In practice, if the fan is intended to be stopped or a rotating speed of the fan is intended to be reduced, the rotating speed instructed by the rotating speed command received by the command detector 20 changes more slowly over time.

Figure 5:
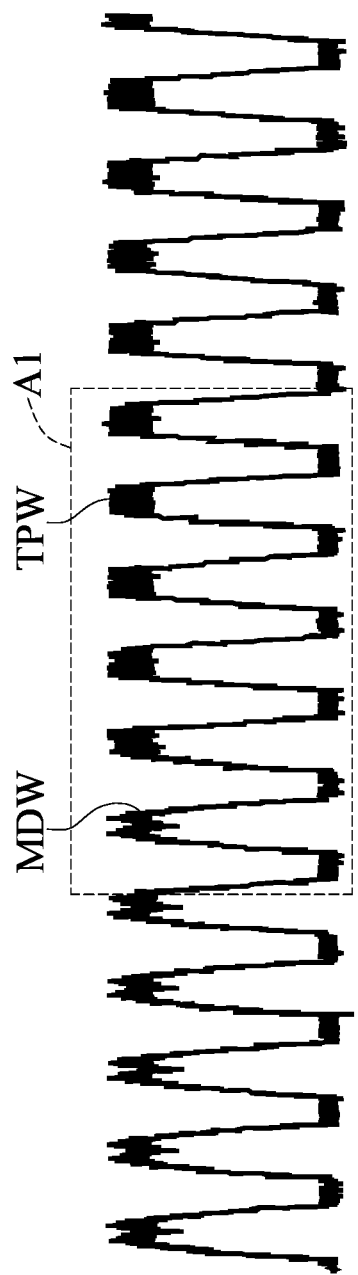
FIG. 5 is a waveform diagram of a driving signal of a motor that is switched between trapezoidal waveforms and sinusoidal waveforms according to the system and the method for driving the motor to rotate at the high speed of the embodiment of the present disclosure.
Figure 6:
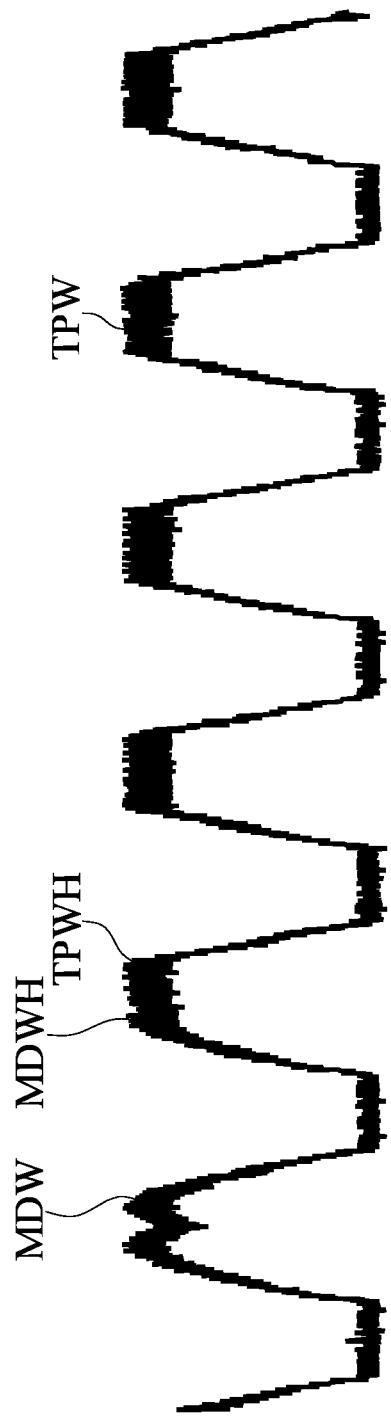
FIG. 6 is an enlarged schematic diagram of a waveform of the driving signal circled by a dotted circle A1 of FIG. 5.

With reference is made to FIGS. 5 and 6, wherein FIG. 5 is a waveform diagram of a driving signal of a motor that is switched between trapezoidal waveforms and sinusoidal waveforms according to the system and the method for driving the motor to rotate at the high speed of the embodiment of the present disclosure; FIG. 6 is an enlarged schematic diagram of a waveform of the driving signal circled by a dotted circle A1 of FIG. 5.

As shown in FIG. 5, the motor driver 40 continuously outputs six complete third harmonic waveform patterns MDW selected by the pattern selector 30.

As shown in FIGS. 5 and 6, after the motor driver 40 continuously outputs the six complete third harmonic waveform patterns MDW, the pattern selector 30 selects the third harmonic waveform pattern MDW. However, when the motor driver 40 outputs the driving signal based on the incomplete third harmonic waveform pattern MDW, the pattern selector 30 selects the modulated waveform pattern TPW that is the trapezoidal waveform pattern instead of the third harmonic waveform pattern MDW. At this time, the motor driver 40 obtains a seventh waveform shown in FIG. 5, which is composed of an incomplete third harmonic waveform pattern MDWH and an incomplete trapezoidal waveform pattern TPWH. That is, the incomplete trapezoidal waveform pattern TPWH is outputted successively after the incomplete harmonic waveform pattern MDWH is outputted. Then, the motor driver 40 obtains an eighth waveform and its subsequent waveforms as shown in FIG. 5 that are complete trapezoidal waveforms TPW.

In summary, the present disclosure provides the system and the method for driving the motor to rotate at the high speed, which drive the motor to rotate based on the reference waveform pattern such as the sinusoidal waveform or the third harmonic waveform such that the motor only generates low vibration noise to meet a client's requirement. The motor may be switched to be driven to rotate at the high speed based on the trapezoidal waveform or the square waveform such that the fan applying the motor has a better heat dissipation effect to effectively reduce the temperature of the integrated circuit, thereby preventing the integrated circuit from being damaged by a high temperature. Therefore, the system and the method for driving the motor to rotate at the high speed provided by the present disclosure have better applicability and utility.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for driving a motor to rotate at a high speed, comprising:
a lookup table module configured to store a reference waveform pattern and a modulated waveform pattern, wherein a waveform of the reference waveform pattern is different from a waveform of the modulated waveform pattern, and a voltage amplitude of the modulated waveform pattern is larger than a voltage amplitude of the reference waveform pattern;
a command detector configured to receive a rotating speed command;
a pattern selector connected to the lookup table module and the command detector, and configured to receive the reference waveform pattern and the modulated waveform pattern from the lookup table and receive the rotating speed command from the command detector, wherein the pattern selector selects the reference waveform pattern when the pattern selector determines that a rotating speed instructed by the rotating speed command does not reach a rotating speed threshold, and the pattern selector selects the modulated waveform pattern when the pattern selector determines that the rotating speed instructed by the rotating speed command reaches the rotating speed threshold; and
a motor driver connected to the pattern selector, and configured to compare a triangle wave signal with the reference waveform pattern or the modulated waveform pattern that is selected by the pattern selector to output a driving signal for driving the motor to rotate;
wherein the reference waveform pattern includes a third harmonic waveform pattern, and the modulated waveform pattern includes a trapezoidal waveform pattern;
wherein, when the rotating speed instructed by the rotating speed command reaches the rotating speed threshold and the motor driver has outputted the driving signal only based on an incomplete reference waveform pattern to the motor during one part of a period of the reference waveform pattern, the motor driver then outputs the driving signal only based on an incomplete period of the modulated waveform pattern to the motor during the other parts of the period of the reference waveform pattern such that the driving signal received by the motor includes a waveform that is composed of an incomplete third harmonic waveform pattern and an incomplete trapezoidal waveform pattern.

2. The system of claim 1, wherein the reference waveform pattern further includes a sinusoidal waveform pattern.

3. The system of claim 1, wherein the modulated waveform pattern further includes a square wave pattern.

4. A method for driving a motor to rotate at a high speed, comprising the following steps:
providing a reference waveform pattern and a modulated waveform pattern by a lookup table module, wherein a waveform of the reference waveform pattern is different from a waveform of the modulated waveform pattern and a voltage amplitude of the modulated waveform pattern is larger than a voltage amplitude of the reference waveform pattern;
receiving a rotating speed command by a command detector;
determining whether or not a rotating speed instructed by the rotating speed command reaches a rotating speed threshold, in response to determining that the rotating speed instructed by the rotating speed command reaches the rotating speed threshold, selecting the modulated waveform pattern, in response to determining that the rotating speed instructed by the rotating speed command does not reach the rotating speed threshold, selecting the reference waveform pattern, wherein the reference waveform pattern includes a third harmonic waveform pattern and the modulated waveform pattern includes a trapezoidal waveform pattern; and
when the rotating speed instructed by the rotating speed command reaches the rotating speed threshold and the motor driver has outputted the driving signal only based on an incomplete reference waveform pattern to the motor during one part of a period of the reference waveform pattern, the motor driver then outputs the driving signal only based on an incomplete period of the modulated waveform pattern to the motor during the other parts of the period of the reference waveform pattern such that the driving signal received by the motor includes a waveform that is composed of an incomplete third harmonic waveform pattern and an incomplete trapezoidal waveform pattern.

5. The system of claim 1, wherein the reference waveform pattern further includes a sinusoidal waveform pattern.

6. The system of claim 1, wherein the modulated waveform pattern further includes a square wave pattern.

* * * * *